US010890212B2

(12) United States Patent
Kobielski et al.

(10) Patent No.: US 10,890,212 B2
(45) Date of Patent: Jan. 12, 2021

(54) THERMAL MANAGEMENT STRUCTURE FOR A BEARING ASSEMBLY

(71) Applicant: Transportation IP Holdings, LLC, Norwalk, CT (US)

(72) Inventors: Louis Kobielski, Sherman, NY (US); Adam C. Felton, Grove City, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 16/811,231

(22) Filed: Mar. 6, 2020

(65) Prior Publication Data

US 2020/0248749 A1 Aug. 6, 2020

Related U.S. Application Data

(63) Continuation-in-part of application No. 16/268,589, filed on Feb. 6, 2019, now Pat. No. 10,619,670.

(51) Int. Cl.
*F16C 17/06* (2006.01)
*F16C 37/00* (2006.01)

(52) U.S. Cl.
CPC .......... *F16C 17/065* (2013.01); *F16C 37/002* (2013.01); *F16C 2360/23* (2013.01)

(58) Field of Classification Search
CPC ...... F16C 17/06; F16C 17/065; F16C 32/067; F16C 32/0666; F16C 32/0677; F16C 33/108; F16C 37/002
See application file for complete search history.

(56) References Cited

U.S. PATENT DOCUMENTS

| 4,746,230 | A | * | 5/1988 | Jensen | F16C 17/03 384/311 |
| 5,503,479 | A | * | 4/1996 | Ide | F16C 27/02 384/122 |
| 5,513,917 | A | * | 5/1996 | Ide | F16C 32/0666 384/100 |
| 9,169,866 | B2 | * | 10/2015 | Sato | F16C 17/045 |
| 9,874,247 | B2 | * | 1/2018 | Wang | F16C 17/03 |

FOREIGN PATENT DOCUMENTS

| JP | 2002206522 A | * | 7/2002 | .......... F16C 33/1045 |
| JP | 2003120675 A | * | 4/2003 | ............ F16C 37/002 |

OTHER PUBLICATIONS

Dr. Kenneth R. Bischof, "Bearing design reduces performance variability", www.engineerlive.com.
"Flexure Pivot® Tilt Pad Bearings", 2014-2019 Dover Precision Components, www.waukeshabearings.com.

\* cited by examiner

*Primary Examiner* — Phillip A Johnson
(74) *Attorney, Agent, or Firm* — Mary D. Lawlor; The Small Patent Law Group LLC (57) ABSTRACT

A thermal management structure may include a body and a pad. The body extends between a first outer surface and a second outer surface. The pad moves relative to the body. A thermal management channel extends within a portion of the body and extends within a portion of the pad. The thermal management channel directs fluid to one or more locations within the body and to one or more locations within the pad.

20 Claims, 6 Drawing Sheets

THERMAL MANAGEMENT STRUCTURE FOR A BEARING ASSEMBLY

CROSS-REFERENCE TO RELATED APPLICATIONS

This application is a continuation-in-part of U.S. patent application Ser. No. 16/268,589, filed 6 Feb. 2019. The entire disclosure is incorporated herein by reference.

BACKGROUND

Technical Field

Embodiments of the disclosure relate to bearing assemblies and thermal management structures.

Discussion of Art

Bearing assemblies, such as thrust bearings or journal bearings, are used in rotary applications and permit rotation between parts and support predominantly axial loads. Turbines used for the generation of electric power include a thrust bearing to protect against axial motion of the turbine rotor assembly. The thrust bearing may be provided at a position intermediate the low-pressure and high-pressure stages of a turbine. The axial position of the turbine rotor shaft is an important variable in the operation of the power plant since a variation of only a few hundreds of an inch in a device that is tens of feet long can result in damage to seals.

Known tilting pad journal and thrust bearings are formed of multiple pieces, including a ring carrier, a round socket joint, and a pad that sits on top of the socket joint to reduce wear damage to the ring carrier caused by the axial forces by the turbine rotor shaft. The individual pieces may be formed by casting and/or machining blocks of metal that are joined together. Joints between the multiple components are subject to the different loads of the turbine. Additionally, the multiple components are joined together at rigid joints that may be subject to increased risk of fracture.

Furthermore, as the designs of turbines improve, turbine assemblies are capable of operating at higher loads, thereby increasing the operating temperature of the turbine assemblies. Cooling passages formed within the bearings are limited by the machining capabilities of the bearing components. As the manufacturing complexity of the bearing increases, so does the cost of the bearing. It may be desirable to have a system structure and assembly that differs from those that are currently available.

BRIEF DESCRIPTION

In one embodiment, a thrust bearing assembly includes a body comprising a first outer surface and a second outer surface, and a pocket extending between an open end at the first outer surface and a closed end disposed within the body between the first outer surface and the second outer surface. The assembly includes a pad comprising a base end and a free end. The base end is coupled to the closed end of the pocket and the free end is disposed proximate the first outer surface of the body. The body and the pad are configured to be formed as a unitary component. The assembly also includes a cooling channel extending within the body and the pad. The cooling channel is configured to fluidly couple the body with the pad. The cooling channel directs cooling fluid to one or more positions within the body and one or more positions within the pad.

In one embodiment, a thrust bearing assembly includes a body comprising a first outer surface and a second outer surface. The body extending about a center axis of the thrust bearing assembly. The body includes a pocket extending between an open end at the first outer surface and a closed end disposed a distance away from the first outer surface within the body. The assembly includes a pad comprising a base end and a free end. The base end is coupled to the closed end of the pocket and the free end is disposed proximate the first outer surface of the body. The free end of the pad includes a free end surface area and the base end of the pad includes a base end surface area. The free end surface area is greater than the base end surface area. The body and the pad are configured to be formed as a unitary component. A cooling channel extends within the body and the pad. The cooling channel fluidly couples the body with the pad. The cooling channel directs cooling fluid to one or more positions within the body and one or more positions within the pad.

In one embodiment, a thrust bearing assembly includes a body comprising a first outer surface and a second outer surface. The body extends about a center axis of the thrust bearing assembly. The body includes plural pockets. Each pocket extends between an open end at the first outer surface and a closed end disposed a distance away from the first outer surface within the body. The assembly includes plural pads comprising base ends and free ends. The base end of each pad is coupled to the closed end of one of the pockets and the free end of each pad is disposed proximate the first outer surface of the body. The free ends of the plural pads include a free end surface area and the base ends of the plural pads include a base end surface area. The free end surface area is greater than the base end surface area. Each pad is configured to move relative to the body and independent of each other pad. The body and the plural pads are configured to be formed as a unitary component. A cooling system including one or more cooling passages extends within the body and each pad. The cooling system fluidly couples the body with each of the plural pads. The one or more cooling passages direct cooling fluid to one or more positions within the body and one or more positions within each pad between the base end and the free end of each pad.

In one embodiment, a thermal management structure may include a body and a pad. The body extends between a first outer surface and a second outer surface. The pad moves relative to the body. A thermal management channel extends within a portion of the body and extends within a portion of the pad. The thermal management channel directs fluid to one or more locations within the body and to one or more locations within the pad.

In another embodiment, a thermal management structure may include a body and plural pads. The body extends between a first outer surface and a second outer surface. Each of the plural pads includes an inner surface disposed facing toward the second outer surface of the body and an outer surface facing away from the second outer surface of the body. A thermal management channel extends within a portion of the body and extends within a portion of one or more of the pads. The thermal management channel directs fluid to one or more locations within the body. The outer surface of at least one of the pads includes one or more outlets. The thermal management channel directs at least a portion of the fluid to one or more locations within the at least one pad and directs at least a portion of the fluid out of the at least one pad and onto the outer surface of the at least one pad.

In one embodiment, a journal bearing assembly includes a body and plural pads. The body extends between a first outer surface and a second outer surface. Each of the plural pads includes an inner surface disposed facing toward the second outer surface of the body, and an outer surface facing away from the second outer surface of the body. A thermal management structure defines one or more thermal management channels extending within a portion of the body and extending within a portion of at least one of the plural pads. The one or more thermal management channels directs at least a portion of a fluid to one or more locations within the body, at least a portion of the fluid to one or more locations within each of the plural pads, and at least a portion of the fluid out of the at least one of the plural pads and onto the outer surface of the at least one of the plural pads.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the inventive subject matter described herein relates to bearing assemblies and to a thermal management structure thereof. Additively manufactured bearing assemblies may be formed as a unitary or single piece component that may be referred to as monolithic. A bearing assembly may include a body, one or more pads that are coupled with the body, and thermal management channels extending within the body and each of the plural pads. In at least one embodiment, the phrase thermal management may be for cooling and, for ease of illustration, the term "cooling" and "cooling channel" may be used as a non-limiting example of thermal management and thermal management channels throughout. In other embodiments, the thermal management channel may be used to supply a thermal transport fluid that heats, rather than cools. Additionally or alternatively, in other embodiments, the fluid may be used to cool in some instances while heating in other instances.

In one example, the body includes plural pockets having closed ends and open ends. A base end of each pad is coupled with the closed end of each pocket allowing each of the pads to dynamically move, bend, flex, pivot, or tilt responsive to varying axial or thrust forces onto each pad. This movement may be independent of the movement of each other pad. In another example, a base end of each pad may couple with an inner-facing annular surface of the body, and the plural pads may be distributed around a circumference of the inner-facing annular surface of the body. Gaps are disposed between the inner-facing annular surface of the body and the pads such that the pads may move relative to the body into and out of the gaps. The pads may bend, move, flex, pivot, or tilt in one or more different directions based on movement of a shaft extending through the body and contacting the pads. For example, the pads may move radially (e.g., side to side about a center axis of the body) and/or axially (e.g., in directions substantially parallel to a center axis of the body).

The additively manufactured bearing assemblies may be formed of a common, single metal, grade of metal, and/or metallic alloy. In other embodiments, two or more different metals or metal alloys may be used. In yet other embodiments, non-metallic materials may be used with or without a metallic material (e.g., a ceramic or cermet). During production, the bearing assembly may be first formed as a green structure that may then be further processed (e.g., such as by sintering) into a more final state. Postproduction processes may be used to remove some material (such as build supports) or to surface treat the object. Surface treatments may include solvent or acid washes, streams of mildly abrasive polishing compounds, surface coatings (e.g., lubricants, anti-corrosion materials, or the like), and other materials, such as bluing agents or nitriding agents (that, with heat, change the surface characteristics of the postproduction object. A polishing fluid may smooth the inward facing surfaces of the cooling channels, as another example of a surface treatment.

The cooling channels may have differing and/or varying profiles, surface finishes, contours, structures (e.g., baffles, anti-cavitation lips, or the like), shapes, and/or sizes within each of the pads, or may include protrusions to increase the turbulence of the flow of the cooling fluid relative to the absence of protrusions. In one embodiment, the cooling channels may form plural fluidic circuits. The circuits may differ in purpose, location, and/or function. As one example, spot cooling may be applied in one area using a first circuit, while fluid is not flowing through a second circuit in a second area of an assembly. Other possibilities include heating one area while cooling another area using different circuits; or engaging circuits that perform the same function but at different rates based on the operation parameters or environmental factors such that there is a standard first circuit with 1× capability that is used during standard operation, while a high performance circuit with 10× capability is used only during extreme operation.

During use, the cooling channel directs cooling fluid to one or more different positions within the body and within each of the pads. Controlling the flow of cooling fluid (e.g., cooling oil, or the like) within the body and the pads enables a turbine to operate at increased loads while substantially maintaining the temperature of the turbine assembly relative to thrust bearing assemblies that are formed of multiple pieces and cannot include cooling channels or cooling passages within the pads and the body.

Figure 1:
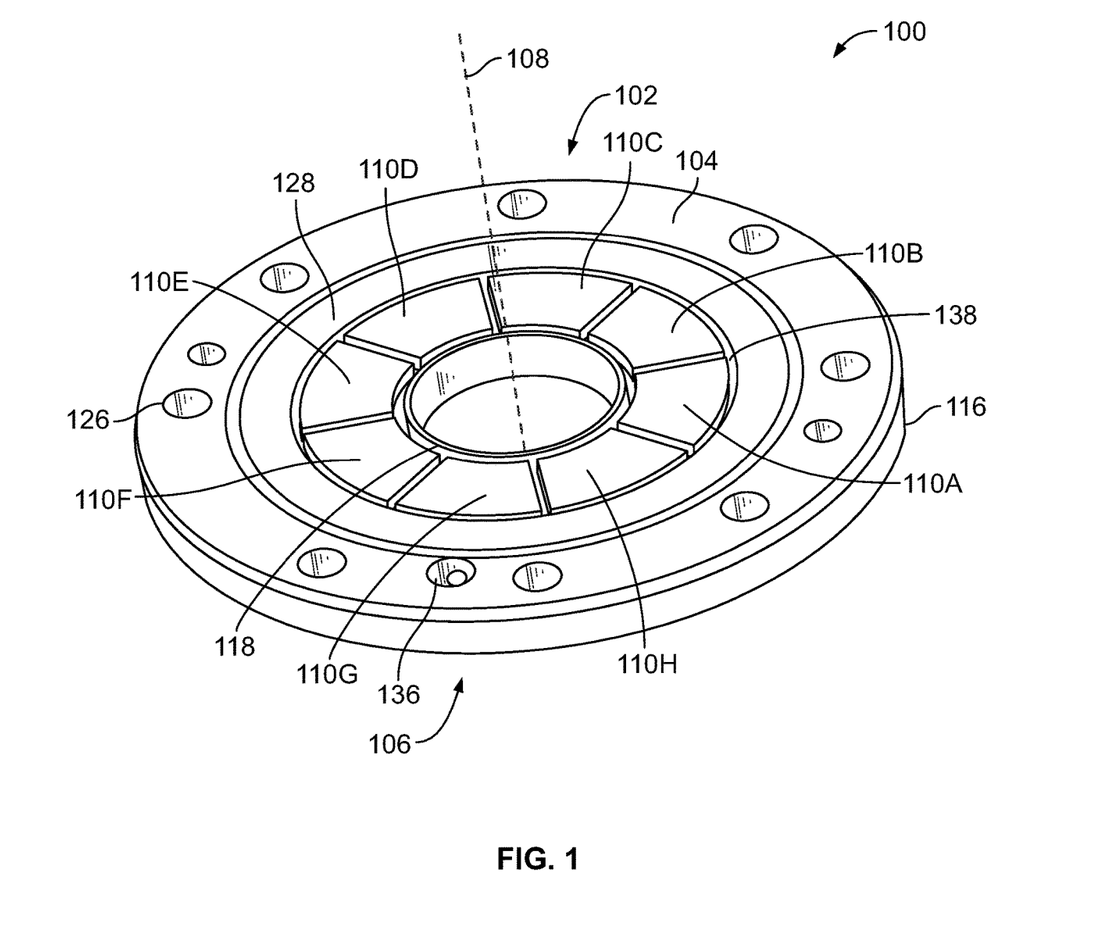
FIG. 1 illustrates one embodiment of a thrust bearing system.
Figure 2:
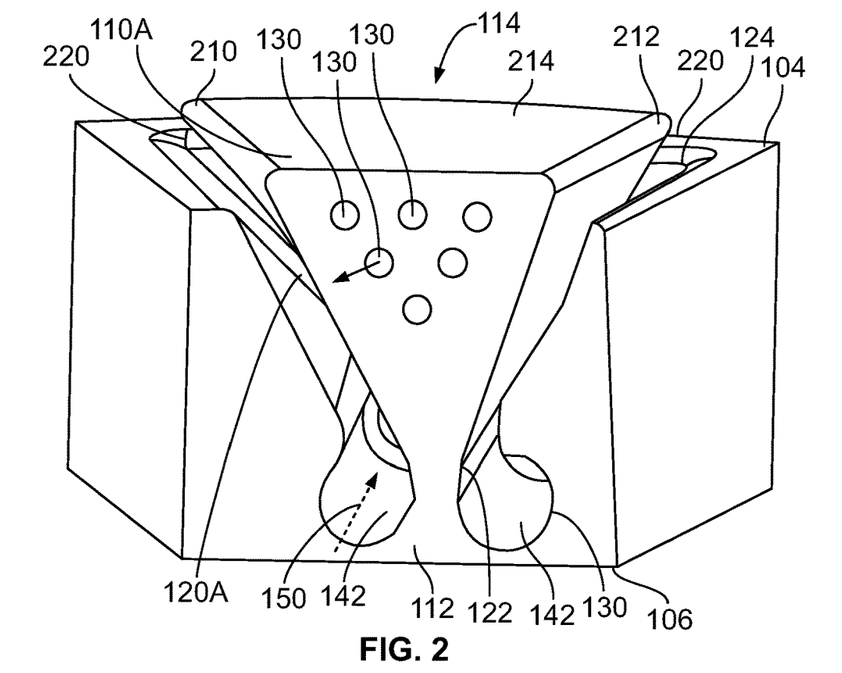
FIG. 2 illustrates a partial cross-sectional view of the thrust bearing system shown in FIG. 1 in accordance with one embodiment.

FIG. 1 illustrates one embodiment of a thrust bearing assembly 100. FIG. 2 illustrates a partial cross-sectional view of the thrust bearing assembly. The thrust bearing assembly may be disposed within an engine system or propulsion system, such as a turbocharger, having one or more rotating components. In one embodiment, an engine system for a locomotive or other rail vehicle includes a turbocharger having one or more thrust bearing assemblies as described herein. The engine system (not shown) may be used in one or more applications, such as automotive, marine, mining, trucking, aerospace, or the like, which may require application specific features and/or designs.

The assembly includes a body 102 having a first outer surface 104 and an opposite second outer surface 106 with a side wall surface 116 extending therebetween the first and second outer surfaces. In one or more embodiments, the first outer surface may also be referred to as a top or thrust bearing surface. For example, the top surface or the thrust bearing surface of the body receives a thrust force or an axial force on the top surface when the engine system is operating. In the illustrated embodiment, the body has a substantially circular shape about a center axis 108 of the body. Additionally, the first and second outer surfaces have substantially planar surfaces. Optionally, the body may have a three-dimensional shape and/or size based on application specific parameters.

The body includes a bore or passage 118 that extends between the first and second outer surfaces and is centered and elongated along the center axis. For example, the passage may receive a shaft of the engine or propulsion system of which the thrust bearing assembly is used. The shaft (not shown) may rotate the body 102 of the thrust bearing assembly in a direction of rotation about the center axis.

The body includes a cooling fluid feeder opening 136 that may be disposed on the first outer surface 104. The cooling fluid feeder opening is a passage that is open at the first outer surface and directs cooling fluid 150 (e.g., such as oil or an alternative cooling fluid) to the first outer surface to cool or reduce a temperature of the first outer surface, to provide lubrication to the first outer surface, or the like. The cooling fluid feeder opening 136 may have any shape, size, or orientation, or the like to direct cooling fluid out of the body and onto the first outer surface. Optionally, the body may include any number of cooling fluid feeder openings disposed at different positions about the center axis.

The body may include plural passages 126 that may be disposed at different positions about the center axis and extend between the first and second outer surfaces of the body. In one embodiment, the passages may be used to mount the thrust bearing assembly to one or more components or surfaces of the engine system (not shown).

In the illustrated embodiment, the first outer surface 104 also includes a first recess 128 that extends about the center axis. For example, the first recess and the body of the assembly are concentric about the center axis. The first outer surface also includes a second recess 138 that is concentric with the first recess 128. The first recess includes a step away from the first outer surface and the second recess includes a step down or away from the first recess. Optionally, the first outer surface may have an incline between the passage 118 and the side wall surface 116 of the body or the first outer surface may include any number of unique or common steps of reduction between the side wall surface and the passage.

The body also includes plural pockets 120 each extending between an open end 124 at the first outer surface and a closed end 122 disposed at a position within the body between the first outer surface and the second outer surface. Each of the pockets has a common pyramidal shape such that a cross-sectional area of the pocket proximate the closed end 122 is less than a cross-sectional area of the pocket proximate the open end 124. For example, the pockets decrease in volume from the first outer surface toward the second outer surface. In the illustrated embodiment, the body includes eight (8) pockets 120A-H that are substantially uniformly disposed radially about the center axis. For example, the pockets are distributed about a circumference of the first outer surface of the body. Optionally, one or more of the pockets 120 may have any alternative unique shape and/or size relative to one or more other pockets.

The thrust bearing assembly includes plural pads 110A-H that are disposed radially about the center axis 108. In the illustrated embodiment, the assembly includes eight (8) pads 110A-H that correspond to the eight pockets 120A-H. Each pad is disposed within one of the pockets of the body. As shown in FIG. 2, each pad includes a base end 112 and a free end 114. The base end is coupled to the closed end of the pocket and the free end is disposed proximate the first outer surface of the body. Each pad also includes an outer surface 214 at the free end. The outer surface engages with a mating component (not shown) as the thrust bearing assembly rotates about the center axis. In the illustrated embodiment, the free end of each pad extends a distance beyond the second recess 138 such that the outer surface of the pad is substantially planar with the first recess. Optionally, the free end of one or more pads may extend any distance between the base end and the free end.

The pads 110 are shaped and sized to be disposed within the pockets of the body. In the illustrated embodiment, the pockets have an increasing substantially pyramidal shape between the closed end 122 and the open end 124 of each pocket and the pads have a corresponding increasing substantially pyramidal shape between the base end 112 and the free end 114. For example, the base end of each pad has a base end surface area and the free end of each pad has a free end surface area that is greater than the base end surface area. The volume of the pad decreases from the free end to the base end. In the illustrated embodiment, each pad has a shape that is like a wedge of cheese of a cheese wheel or a pie slice. For example, the pad has a surface area proximate the center axis that is less than a surface area of the pad proximate the side wall surface 116 of the body. Optionally, the pads and/or the pockets may have any alternative quadrilateral shape and/or size. Additionally, the pads fill an amount of the volume of the pockets that is less than the volume of the pockets. For example, each pad has a shape that is substantially common with the shape of the pocket, but the size or volume of the pad is less than the size or volume of the pocket. The pad having a size that is less than a size or volume of the pocket provides room for the pad to move inside the pocket.

The base end of each pad is coupled with the closed end of each pocket but the free end of each pad is not coupled with the open end of each pocket. For example, the pad is allowed to move, bend, flex, pivot, tilt, or the like, in one or more directions relative to the body and relative to the pocket. Each of the pads is able to dynamically move (e.g., bend, flex, pivot, tilt, or the like) as the body of the thrust bearing assembly rotates about the center axis. For example, each of the pads may move dynamically based on varying forces or loads each of the pads may be subject to as the rotating system operates. In one or more embodiments, the pads may also be referred to as springs or spring components, such that the pads are configured to move in a spring motion based on the different loads or forces directed onto the outer surfaces 214. Optionally, one or more of the pads may include one or more components (e.g., extension arms, connecting rods, connecting beams, or the like) that extend between an outer surface of the pad to a surface of the pocket at a position within the pocket between the closed end and the open end. For example, one or more components may be coupled with the pocket and the pad to control am amount of movement of the pad relative to the body. The base end of the pad is shaped and sized to allow the pad to move relative to the body. For example, the base end may be sized to reduce a risk of fracture or failure, and may be sized to increase an amount of allowed movement of the pad.

The assembly also includes a cooling channel 130 that is integrated with the body and the pads. The cooling channel extends within the body and each of the plural pads. In the illustrated embodiment of FIG. 2, the cooling channel is shown directing cooling fluid 150 to different positions within the pad 110A. One or more cooling channels 130 or cooling passages may extend within the body directing the cooling fluid to different positions within the body. (not shown) and directing the cooling fluid to each of the plural pads 110A-H. For example, the cooling channel that extends within the body and within the pads distribute the cooling fluid to different positions within the thrust bearing assembly. Optionally, the cooling channel or the system of cooling channels fluidly coupled with one or more other cooling channels may also be referred to herein as a cooling system that includes plural cooling passages or conduits extending within the body and the pads that distribute the cooling fluid to different locations inside the body and each of the pads.

The cooling channel within the body and the cooling channel within each of the pads may be fluidly coupled with each other via cooling fluid inlets 142. Each cooling fluid inlet directs the cooling fluid from a position within the body into the cooling passage or cooling channel within each pad. The cooling fluid inlets may have any alternative shape and/or size. Optionally, plural different cooling fluid inlets may direct some of the cooling fluid into each of the pads 110A-H. The cooling fluid may be directed or fed into a galley (not shown) of the body of the thrust bearing assembly from a location outside of the thrust bearing assembly. The cooling channels direct the cooling fluid from the galley to different positions within the body and different positions within each of the plural pads. The cooling fluid may be a liquid, a gas, or a liquid-gas mixture that is used to reduce the temperature of the thrust bearing assembly.

In the illustrated embodiment of FIG. 2, the cooling channel 130 within the pad includes plural conduits or passages. The plural conduits and passages of the cooling channel direct the cooling fluid to different positions within the pad at locations underneath the outer surface 214 of the pad. Each of the plural conduits or passages of the cooling channel within the pad may be fluidly coupled with each other such that the cooling channel is a continuous serpentine cooling channel. The continuous serpentine cooling channel directs the cooling fluid in different directions, such as in a direction A that extends in a direction coming out of the page of FIG. 2, and in a direction B that extends in a direction going into the page of FIG. 2. For example, the cooling channel continuously directs the cooling fluid to plural different positions within the pad. In one or more embodiments, the continuous serpentine cooling channel may also extend inside the body and inside each of the plural pads 110A-H. Some cooling passages or conduits disposed within each pad may be fluidly coupled with each other.

In one or more embodiments, the cooling channel extending within the pad may include plural different cooling channels and each cooling channel is fluidly coupled with the cooling fluid inlet 142. For example, each of the plural conduits or passages of the cooling channel may not be fluidly coupled with each other conduit or passage, and the different conduits or passages may direct the cooling fluid to different positions within the pad. A first cooling channel (not shown) may direct at least some of the cooling fluid to positions within the pad proximate the base end 112 of the pad, and a second cooling channel (not shown) may direct at least some of the cooling fluid to positions within the pad proximate the free end 114 of the pad. The continuous serpentine cooling channel or the plural different cooling channels direct the cooling fluid in plural different directions within the pad.

In one or more embodiments, the cooling channel (e.g., a continuous serpentine cooling channel or cooling channels having separate conduits) may have a first size at a first position within the pad (e.g., proximate the base end 112) and may have a different second size that is greater or larger than the first size at a second position within the pad (e.g., proximate the free end 114). For example, the first size may have a cross-sectional area that is larger or greater than a cross-sectional area of the second size, such that the cooling channel has a bigger area or size proximate the base end and has a smaller area or size proximate the free end. The cross-sectional area of the cooling channel may continually increase between a first position and a second position within the pad, may continually decrease between the first and second positions, or any combination therein.

The size of the cooling channel in one pad 110A may be substantially the same or may be different than a size of the cooling channel in a second pad 110B. Optionally, the cooling channel may have a common shape and size within the pad and within the body, or alternatively one or more of the cooling channels may have a different shape and/or size at different positions within the body and the pad. For example, the cooling channel may have a substantially circular cross-sectional shape at a first position within the pad, and may have a substantially oval, rectangular, or any alternative shape at a second position within the pad. The cooling channel may have a size proximate the free end that is greater than a size of the cooling channel proximate the base end to increase the volume of cooling fluid that is directed to toward the free end of the pad. In one or more embodiments, the cooling channel within the first pad 110A may have a cross-sectional area that is larger than a cross-sectional area of the cooling channel within the second pad 110B, the cooling channel within the first pad may be longer than the cooling channel within the second pad such that a volume or amount of cooling fluid that flows within the first pad is greater than a volume or amount of cooling fluid that flows within the second pad, or the like, or any combination therein.

In one or more embodiments, the cooling channel may include one or more protrusions, such as fins, disposed inside the cooling channel that interfere with the flow of the cooling fluid within the cooling channel. For example, the protrusions or fins may increase a surface area of the interior of the cooling channel, may increase a turbulence of the flow of the cooling fluid, or the like.

Each pad also includes a leading edge 210 and a trailing edge 212 with the outer surface 214 disposed therebetween. For example, the leading edge may lead the pad in the direction of rotation of the thrust bearing assembly about the center axis 108. In one embodiment, the cooling channel disposed within the pad is fluidly coupled with a leading edge pocket 220 at the open end 124 of the pocket. The cooling channel directs at least some of the cooling fluid out of the pad and into the leading edge pocket. The cooling fluid is directed from the leading edge pocket onto and across the outer surface of the pad at the free end of the pad in a direction toward the trailing edge of the pad. A trailing edge pocket receives the cooling fluid and directs the cooling fluid back into the pad or to a different position within the body.

The body and each of the plural pads can be manufactured additively as a single, unitary, monolithic component with the cooling channel and each of the cooling fluid inlets that extend within the body and each of the pads 110A-H additively manufactured with the body and each of the pads. For example, the body and each pad may be formed as a unitary body. Additively manufacturing the thrust bearing assembly allows for the thrust bearing assembly to be more compact and include fewer separate and distinct components than non-additively manufactured thrust bearing assemblies, to have varying three-dimensional shapes, to have multi-domain cooling techniques (e.g., cooling channels or passages) within the same unitary component. Additive manufacturing can involve joining or solidifying material under computer control to create a three-dimensional object, such as by adding liquid molecules or fusing powder grains with each other. Examples of additive manufacturing include three-dimensional (3D) printing, rapid prototyping (RP), direct digital manufacturing (DDM), selective laser melting (SLM), electron beam melting (EBM), direct metal laser melting (DMLM), or the like. Alternatively, the thrust bearing assembly 100 can be formed in another manner.

In one or more embodiments, the body and the pads of the thermal management structure may be formed as separate components that may be operably coupled with each other. For example, the body may be formed as a first additively manufactured component including cooling fluid inlets and cooling channels, and each of the pads may be formed as second additively manufactured components including the cooling fluid inlets and the cooling channels disposed therein. For example, each pad may individually be additively manufactured, or all of the pads may be additively manufactured with each other pad as a single unitary component including each pad. In or more alternative embodiments, the body and/or the pads may be manufactured via alternative manufacturing methods or non-additively manufacturing methods. The base end of each of the pads may be operably coupled with the closed end 122 of each pocket 120 to fluidly couple the cooling channels of the body with the cooling channels of the pads. For example, the pads may be allowed to move, bend, flex, pivot, tilt, or the like, relative to the pocket.

In one or more embodiments, the base end of each pad and the closed end of each pocket may have any alternative interface geometry, may include additional joining, coupling, mating, or the like, components and/or materials, or any combination therein. Additively manufacturing the pads 110 with the body 102 as a unitary component enables the pads to move in different ways relative to the pads being coupled or joined with the body after the pads and the body are formed as separate components. For example, the pads additively manufactured with the body as a unitary structure may flex or pivot relative to the body, and the pads coupled with the body with additional joining components may be able to rock or pivot relative to the body. In one or more embodiments, each of the pads may be additively manufactured as a single, unitary component together with each other pad, and the single unitary component of each of the pads may be coupled with the body.

In one or more embodiments, the body and the pads may be manufactured of a common metal alloy. Optionally, the additively manufactured thrust bearing assembly may be manufactured with the body manufactured of a first material and each of the pads manufactured using a different, second material, or the same first material having different properties, or the like. For example, the pads may be manufactured of a metal or metal alloy with increased wear-resistance relative to the metal or metal alloy used to manufacture the body. Optionally, the closed end of the pocket that is coupled to the base end of the pad may be manufactured of a metal or metal alloy that is more ductile relative to the metal or metal alloy used to manufacture the other portions of the body. Optionally, a first portion of the pad (e.g., a portion proximate the base end 112) and a second portion of the pad (e.g., a portion proximate the free end 114) as a unitary body where the first portion of the pad may be manufactured of a first material and the second portion of the pad may be manufactured of a different, second material, may be manufactured of the first material having different properties than the first material, or the like.

Figure 3:
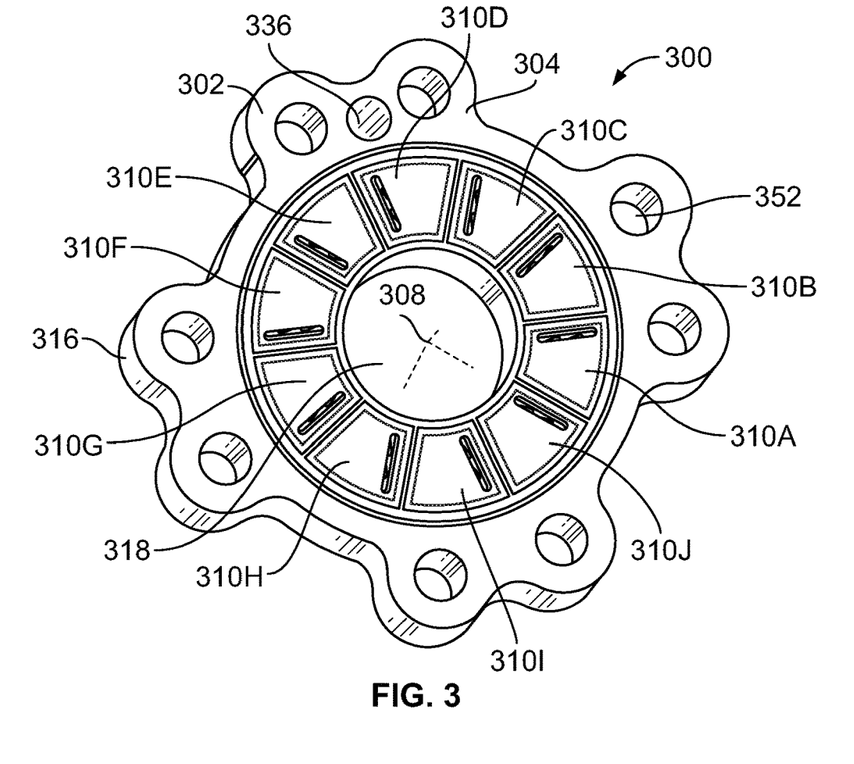
FIG. 3 illustrates one embodiment of a thrust bearing system.
Figure 4:
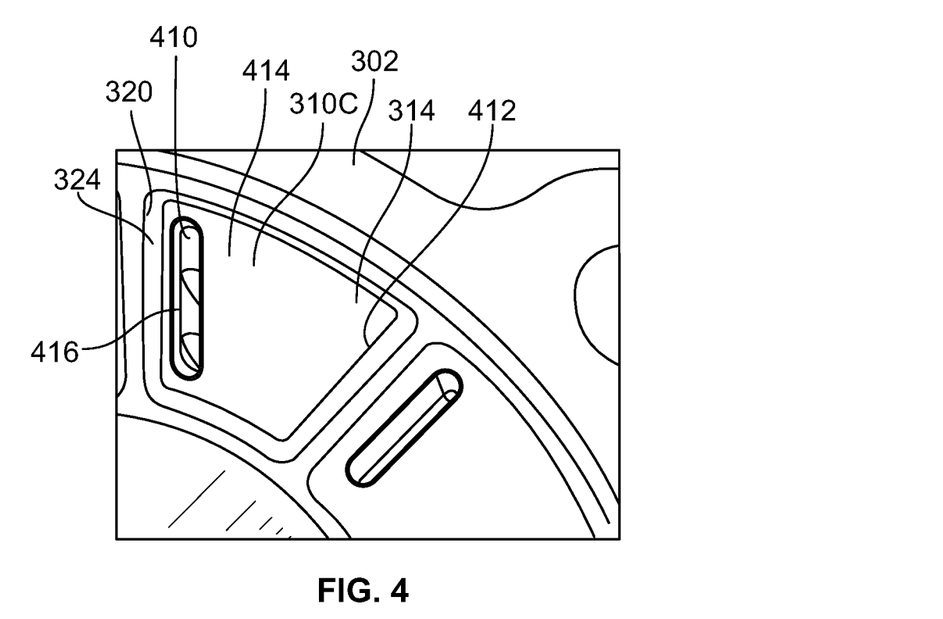
FIG. 4 illustrates a magnified view of the thrust bearing system show in FIG. 3 in accordance with one embodiment.
Figure 5:
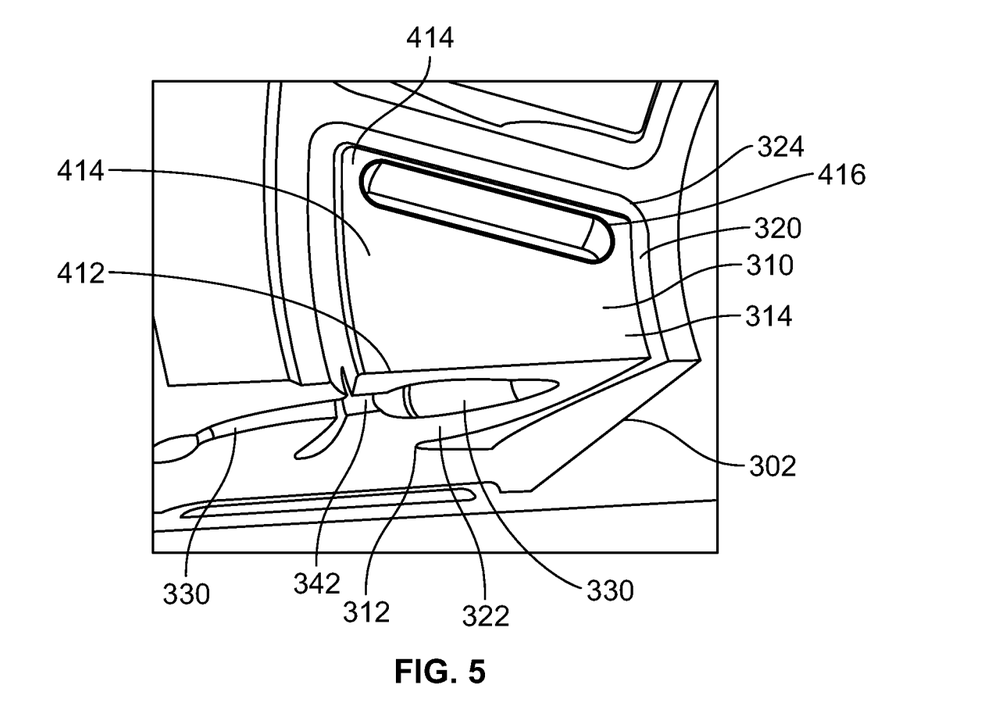
FIG. 5 illustrates a magnified partial cross-sectional view of the thrust bearing system shown in FIG. 3 in accordance with one embodiment.

FIG. 3 illustrates one embodiment of a thrust bearing assembly 300. FIG. 4 illustrates a magnified view of the thrust bearing assembly. FIG. 5 illustrates a magnified partial cross-sectional view of the thrust bearing assembly. FIGS. 3 through 5 will be discussed together herein.

The thrust bearing assembly 300 is similar to the thrust bearing assembly 100 illustrated in FIGS. 1 and 2, however the thrust bearing assembly 300 has an alternative shape, includes a greater number of pads 310, and has different configurations of cooling channels disposed within a body 302 and each pad 310A-J of the thrust bearing assembly 300. The body 302 includes a first outer surface 304 and a second outer surface (not shown) with a side wall surface 316 extending therebetween. The body also includes plural passages 352 disposed about a center axis 308 and extend between the first and second outer surfaces of the body. In one embodiment, the passages may be used to mount the thrust bearing assembly to one or more components or surfaces of the engine system (not shown). The body includes a bore or passage 318 that extends between the first outer surface and the opposite second outer surface and is centered and elongated along the center axis. For example, the passage may receive a shaft of the engine or propulsion system of which the thrust bearing assembly is used. The shaft (not shown) may rotate the body of the thrust bearing assembly in a direction of rotation about the center axis.

The body 302 includes a cooling fluid feeder opening 336 that is disposed on the first outer surface 304. The cooling fluid feeder opening is a passage that is open at the first outer surface and directs cooling fluid to the first outer surface to cool or reduce a temperature of the first outer surface, to provide lubrication to the first outer surface, or the like. The cooling fluid feeder opening may have any shape, size, or orientation, or the like to direct cooling fluid out of the body and onto the first outer surface. Optionally, the body may include any number of cooling fluid feeder openings disposed at different positions about the center axis.

The body includes plural pockets 320 each extending between an open end 324 at the first outer surface 304 and a close end 322 disposed at a position within the body between the first and second outer surfaces. Each pocket has a common shape relative to each other pocket that is substantially pyramidal such that a cross-sectional area of the pocket proximate the closed end is less than a cross-sectional area of the pocket proximate the open end. For example, the pockets decrease in volume from the first outer surface in a direction toward the second outer surface.

The assembly 300 includes the plural pads 310A-J that correspond to the plural pockets 320 of the body. Each pad 310 includes a base end 312 and a free end 314. The base end is coupled to the closed end 322 of the pocket 320 and the free end 314 is disposed proximate the first outer surface 304 of the body. Each pad includes an outer surface 414 at the free end that extends between a leading edge 410 and a trailing edge 412. The outer surface engages with a mating component (not shown) as the thrust bearing assembly rotates about the center axis. The pads are sized and shaped to be disposed within the pockets. The pads fill an amount of the volume of the pockets that is less than the volume of the pockets. For example, each pad has a shape that is substantially common with the shape of the pocket, but the size or volume of the pad is reduced or less than the size or volume of the pocket. The size of the pad is based on an amount of movement the pad may be designed to do inside the pocket.

Each pad 310 is coupled with each pocket 320 via the base end 312 of each pad is coupled with the closed end 322 of each pocket. For example, the pad is allowed to move, bend, flex, pivot, tilt, or the like, relative to the pocket and the body. Each of the pads is able to dynamically move (e.g., bend, flex, pivot, tilt, or the like) as the body of the thrust bearing assembly rotates about the center axis based on varying forced directed onto each of the pads. The size of the base end of the pad and a surface area of the base end that is coupled with the closed end of the pocket is designed to reduce a risk of fracture or failure of a joint between the base end and the closed end, and may be sized to increase an amount of movement that the pad is allowed to make.

The assembly 300 includes a cooling channel 330 that extends within the body and each of the plural pads. The cooling channel directs the cooling fluid to different positions within the body and within each of the plural pads 310A-J. The cooling channel within the body is fluidly coupled with the cooling channel within each of the pads via cooling fluid inlets 342. Each cooling fluid inlet directs the cooling fluid from positions within the body into the cooling passage or cooling channel within each pad. In one or more embodiments, the cooling channel or the system of cooling channels fluidly coupled with one or more of each other cooling channel may also be referred to herein as a cooling system that includes plural cooling passages or conduits extending within the body and the pads that distribute the cooling fluid to different positions inside the body and each of the pads. The cooling fluid may be a liquid, a gas, or a liquid-gas mixture that is used to reduce the temperature of the thrust bearing assembly.

Each pad 310 also includes a cooling fluid groove 416 that is disposed proximate the leading edge 410 of each pad. In the illustrated embodiment, the cooling fluid grooves are open passages at the outer surface 414 of each pad, however in alternative embodiments, the grooves may be positioned on a side-wall surface of one or more of the pads. The cooling fluid groove is fluidly coupled with one or more of the cooling channels 330 within the pad such that the cooling channels direct at least some of the cooling fluid from a position inside the pad to the cooling fluid groove. The cooling fluid that collects in the cooling fluid groove flows out of the cooling fluid groove and across the outer surface 414 of the pad in a direction from the leading edge 410 toward the trailing edge 412 of the pad.

The body and each of the plural pads 310A-J can be manufactured additively as a single, unitary component with the cooling channel and each of the cooling fluid inlets 342 that extend within the body and each of the pads additively manufactured with the body and each of the pads. The body and the pads may be manufactured of a common metal alloy, or different portions of the body and/or the pads may be manufactured using different metals or metal alloys, using common metal alloys having different properties, or the like.

In one or more embodiments of the subject matter described herein, a thrust bearing assembly includes a body comprising a first outer surface and a second outer surface, and a pocket extending between an open end at the first outer surface and a closed end disposed within the body between the first outer surface and the second outer surface. The assembly includes a pad comprising a base end and a free end. The base end is coupled to the closed end of the pocket and the free end is disposed proximate the first outer surface of the body. The body and the pad are configured to be formed as a unitary component. The assembly also includes a cooling channel extending within the body and the pad. The cooling channel is configured to fluidly couple the body with the pad. The cooling channel directs cooling fluid to one or more positions within the body and one or more positions within the pad.

Optionally, the cooling channel may be configured to direct the cooling fluid in plural directions inside the pad. Optionally, the cooling channel may be configured to direct the cooling fluid to one or more positions inside the pad between the base end and the free end. Optionally, the cooling channel may comprise a first size at a first position within the pad and the cooling channel further comprises a different, second size at a different, second position within the pad. Optionally, the cooling channel may comprise a first shape at a first position within the pad, and the cooling channel further comprises a different, second shape at a different, second position within the pad.

Optionally, the pad may comprise an outer surface at the free end of the pad fluidly coupled with the cooling channel. The cooling channel is configured to direct the cooling fluid out of the pad and onto the outer surface of the pad. Optionally, the free end of the pad may include a leading edge and a trailing edge. The cooling channel is configured to direct the cooling fluid out of the pad at the leading edge and in a direction toward the trailing edge across an outer surface at the free end of the pad. Optionally, the pad may be configured to move relative to the body. Optionally, the body may be configured to be manufactured of a first material, and the pad is configured to be manufactured of a different, second material. Optionally, a first portion of the pad may be configured to be manufactured of a first material, and a second portion of the pad is configured to be manufactured of a second material.

Optionally, the first portion of the pad and the second portion of the pad may be configured to be formed as a unitary body. Optionally, the cooling channel may be configured to distribute the cooling fluid within the body and the pad. Optionally, the free end of the pad may include a free end surface area and the base end of the pad includes a base end surface area. The free end surface area is greater than the base end surface area. Optionally, the pad may include a quadrilateral shape. Optionally, the body may comprise a cooling fluid inlet fluidly coupled with the cooling channel. The cooling fluid inlet is configured to direct the cooling fluid into the cooling channel.

Optionally, the pad is a first pad and the pocket is a first pocket. The thrust bearing assembly may include plural pads and plural pockets. The base end of each of the plural pads is coupled to the closed end of each pocket of the body. Optionally, each of the plural pads may be configured to be disposed radially about the center axis. Optionally, the body and each of the plural pads may be configured to be formed as a unitary component. Optionally, the cooling channel may extend within the body and each of the plural pads to direct cooling fluid inside each of the plural pads. Optionally, the cooling channel may be a continuous serpentine cooling channel configured to extend inside the body and inside each of the plural pads. Optionally, the assembly may include plural cooling channels. Each cooling channel is configured to direct cooling fluid into and out of each of the plural pads. Optionally, each cooling channel may be fluidly coupled with each other cooling channel. Optionally, each cooling channel may be configured to be additively manufactured within the body and each of the plural pads. Optionally, the body may comprise a cooling fluid inlet fluidly coupled with each of the cooling channels. The cooling fluid inlet directs the cooling fluid into each of the cooling channels.

In one or more embodiments of the subject matter described herein, a thrust bearing assembly includes a thermal management structure having a body that has a first outer surface and a second outer surface. The body extends about a center axis of the thrust bearing assembly. The body includes a pocket extending between an open end at the first outer surface and a closed end disposed a distance away from the first outer surface within the body. The assembly includes a pad comprising a base end and a free end. The base end is coupled to the closed end of the pocket and the free end is disposed proximate the first outer surface of the body. The free end of the pad includes a free end surface area and the base end of the pad includes a base end surface area. The free end surface area is greater than the base end surface area. The body and the pad are configured to be formed as a unitary component. A cooling channel extends within the body and the pad. The cooling channel fluidly couples the body with the pad. The cooling channel directs cooling fluid to one or more positions within the body and one or more positions within the pad.

In one or more embodiments of the subject matter described herein, a thrust bearing assembly includes a thermal management structure having body that has a first outer surface and a second outer surface. The body extends about a center axis of the thrust bearing assembly. The body includes plural pockets. Each pocket extends between an open end at the first outer surface and a closed end disposed a distance away from the first outer surface within the body. The assembly includes plural pads including base ends and free ends. The base end of each pad is coupled to the closed end of one of the pockets and the free end of each pad is disposed proximate the first outer surface of the body. The free ends of the plural pads include a free end surface area and the base ends of the plural pads include a base end surface area. The free end surface area is greater than the base end surface area. Each pad is configured to move relative to the body and independent of each other pad. The body and the plural pads are configured to be formed as a unitary component. A cooling system including one or more cooling passages extends within the body and each pad. The cooling system fluidly couples the body with each of the plural pads. The one or more cooling passages direct cooling fluid to one or more positions within the body and one or more positions within each pad between the base end and the free end of each pad.

Figure 6:
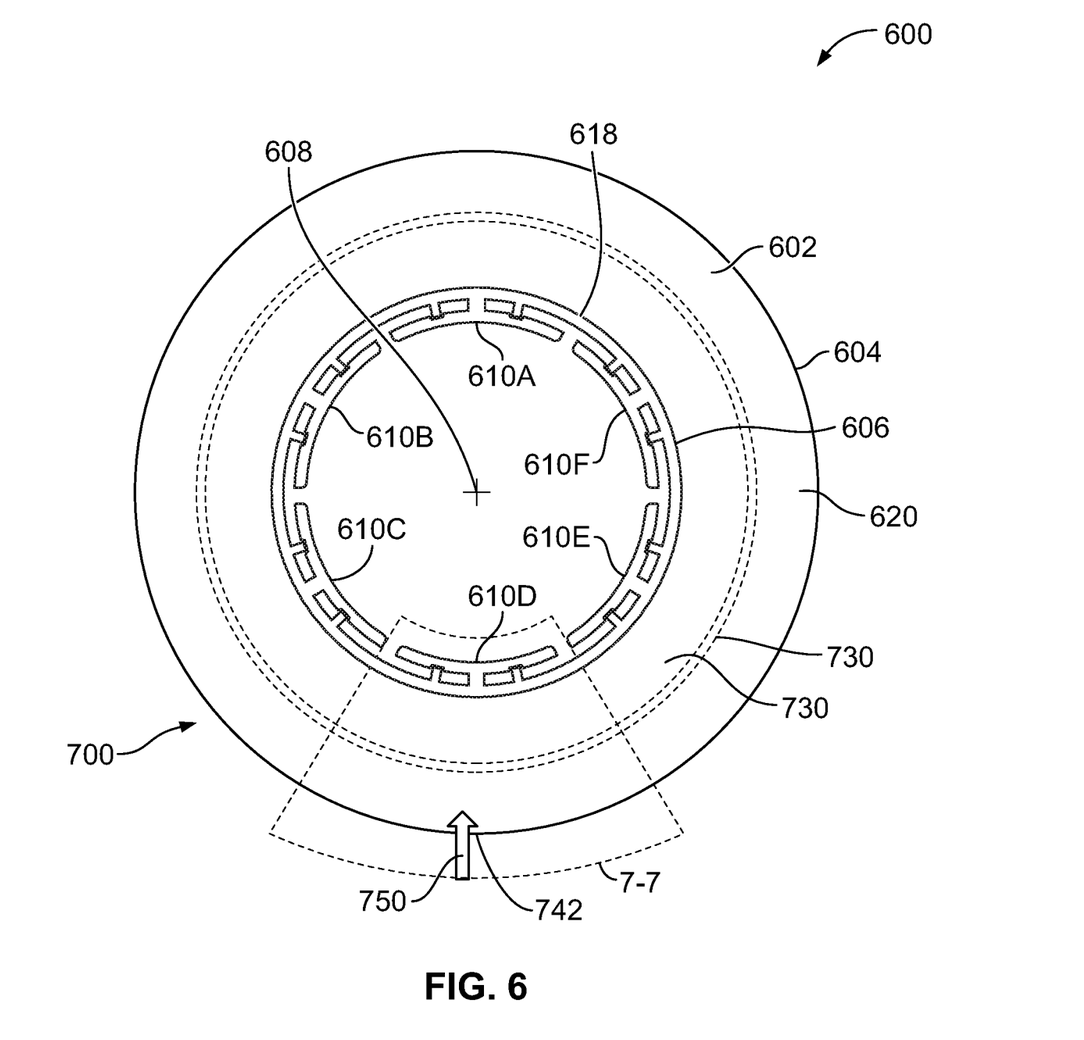
FIG. 6 illustrates a cross-sectional front view of a tilting pad journal bearing assembly in accordance with one embodiment.
Figure 7:
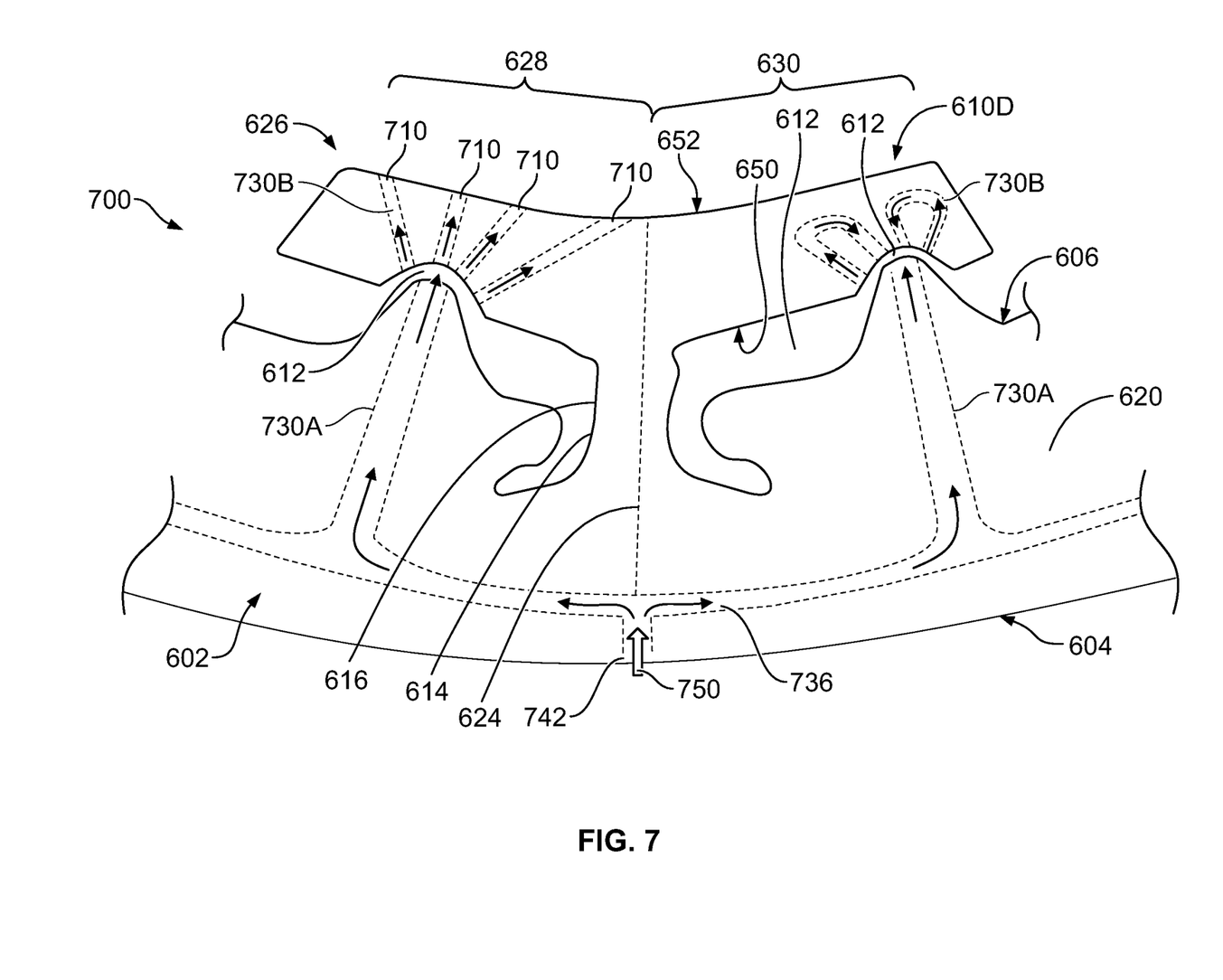
FIG. 7 illustrates a magnified partial cross-sectional view of the tilting pad journal bearing assembly shown in FIG. 6.

FIG. 6 illustrates a cross-sectional front view of a tilting pad journal bearing assembly 600 in accordance with one embodiment. FIG. 7 illustrates a magnified partial cross-sectional view of the tilting pad journal bearing assembly 600. FIGS. 6 and 7 will be discussed together herein.

Like the bearing assemblies 100, 300 illustrated in FIGS. 1 through 5, the bearing assembly 600 may be disposed within an engine system or propulsion system, such as a turbocharger, or any other system having one or more rotating components. The bearing assembly includes a thermal management structure 700 that manages a temperature of the bearing assembly. The thermal management structure includes a body 602 having a first outer surface 604 and an opposite second outer surface 606. In one or more embodiments, the first outer surface may be referred to as an outer-facing annular surface of the body, and the second outer surface may be referred to as an inner-facing annular surface of the body. For example, the first and second outer surfaces face away from or towards, respectively, a center bore or passage 618 through which a center axis 608 of the assembly extends. For example, the passage may receive a shaft of the engine, propulsion system, or any other system. The shaft (not shown) may rotate in a direction of rotation about the center axis relative to the body. The body also includes a first end 620 and a second end (shown in FIG. 8) as the body extends along the center axis. In one or more embodiments, the first end may be referred to as the front of the assembly, and the second end may be referred to as the rear of the assembly. In one or more embodiments, the passage may be referred to as a neck of the assembly. The neck may be substantially cylindrical between the first and second ends of the body along the center axis.

Additionally, like the bearing assemblies 100, 300, the bearing assembly 600 includes plural pads 610A-F that are coupled to the inner-facing annular surface (e.g., the second outer surface 606) of the body and are distributed around a circumference of the inner-facing annular surface of the body. In the illustrated embodiment, six pads are substantially uniformly disposed around the circumference of the inner-facing annular surface, however the assembly may include any number of pads. As illustrated in FIG. 7, the pad 610D is coupled to the second outer surface of the body at a joint 614. The pad includes an inner surface 650 that is disposed facing toward the second outer surface of the body, and an outer surface 652 that is disposed facing away from the second outer surface of the body. For example, the outer surface 652 faces toward the center axis 608 of the assembly. In the illustrated embodiment, the pad has a T-like shape including a post 616 that is elongated along an axis 624 and is coupled with the body at the joint, and a cross-bar 626 that includes first and second portions 628, 630, respectively, that are disposed on either side of the axis. However, in alternative embodiments, one or more of the pads may have an alternative shape and/or size based in part on application specific parameters. The axis of the pad may extend radially from the center axis of the assembly.

Figure 8:
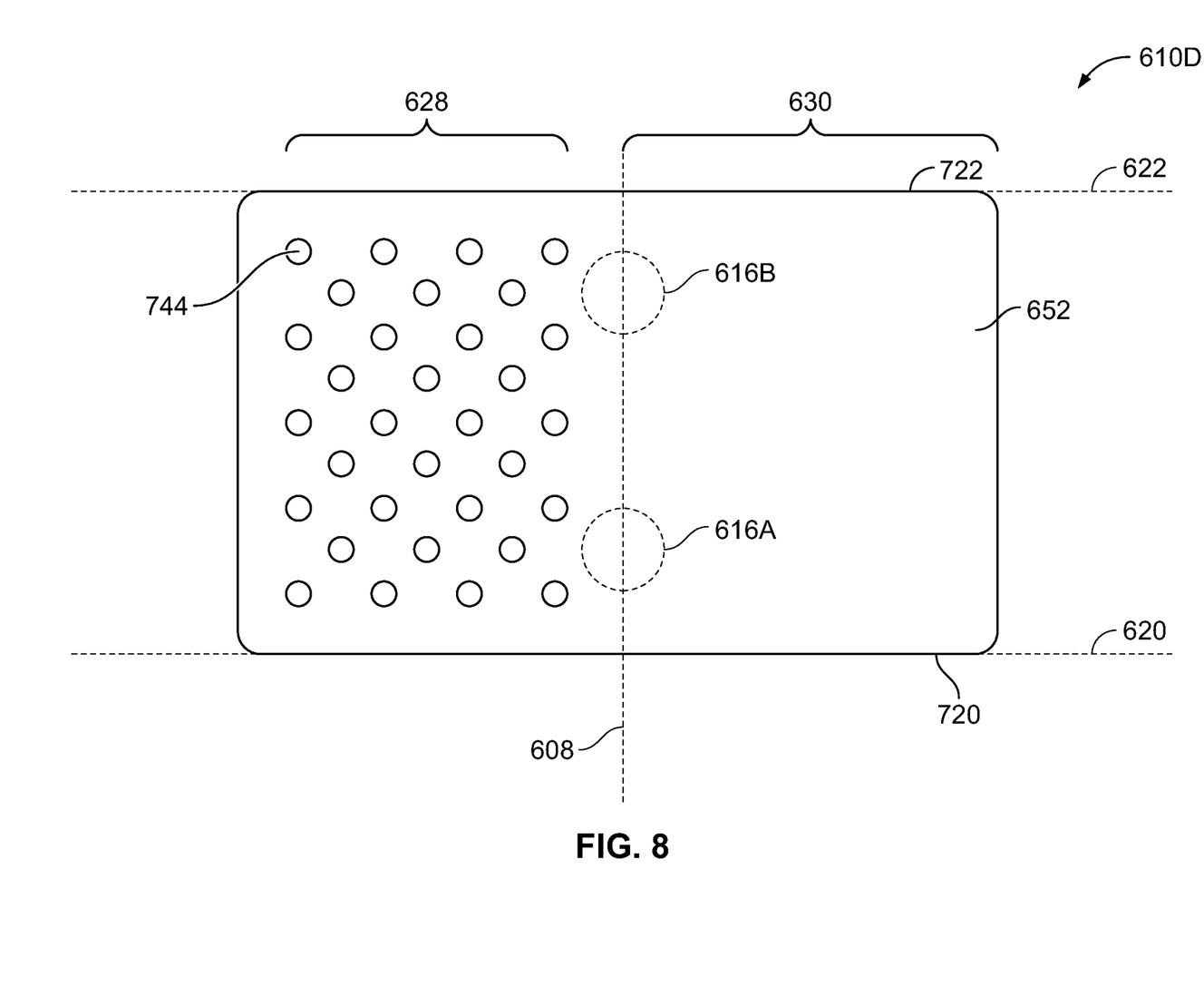
FIG. 8 illustrates a top view of an outer surface of a pad of a bearing assembly in accordance with one embodiment.

In one or more embodiments, one or more of the pads may extend a distance between the first end 620 and the second end 622 of the body along the center axis 608. For example, FIG. 8 illustrates a top view of the pad 610D. The pad extends between a first end 720 that may be disposed at or proximate to the first end 620 of the body and a second end 722 that may be disposed at or proximate to the second end of the body. A first post 616A couples the pad with the body at a first location along the center axis 608, and a second post 616B couples the pad with the body at a second location along the center axis. Optionally, one or more of the pads may extend only a portion of the distance between the first and second ends of the body. For example, one or more of the pads may be nested within the body such that the pad does not extend to the first end and/or the second end of the body. Additionally or alternatively, one or more of the pads may include one or more posts 616 that may couple the pad to the second outer surface of the body. For example, one or more of the pads may include two or more posts disposed at positions along the center axis between the first end and the second end. The additional posts may increase a structural integrity of the pads coupled to the body.

The structure may include gaps 612 that are disposed between the second outer surface of the body and the inner surfaces 650 of the pads. In the illustrated embodiment of FIG. 7, the gaps are disposed on either side of the post 616 of the T-shaped pad. The pad moves within the gaps relative to the body responsive to one or more forces onto the pad from a shaft (not shown) disposed within the passage 618. Like the pads 110 illustrated in FIGS. 1 through 5, the pads 610 dynamically move relative to the body responsive to varying axial or thrust forces directed onto each pad, such as by a shaft within the passage 618. Each pad may move, tilt, bend, flex, pivot, or the like, independent of the movement of each other pad. For example, the pads may move in one or more directions relative to the body and responsive to varying forces directed onto the pads. For example, the pads 610 may move radially (e.g., about the center axis 608) and/or axially (e.g., into and out of the page, such as in directions substantially parallel to the center axis 608). As one example, the pads may axially tilt (e.g., side to side) if a shaft disposed within the passage 618 is not normal to the axis of the assembly.

The thermal management structure may define one or more cooling channels or thermal management channels 730 that are integrated with the body 602 and the pads 610. The thermal management channel 730 directs fluid 750 to different locations within the body and to different locations within the pads. The fluid is directed into the thermal management channel via a fluid inlet 742 disposed at the first outer surface 604 of the body. In the illustrated embodiment of FIGS. 6 and 7, the thermal management structure includes a single fluid inlet, but alternatively may include any number of inlets disposed at any circumferential location along the first outer surface of the body. Suitable fluids may be a liquid, a gas, or a liquid-gas mixture that is used to control a temperature of the journal bearing assembly. Some nonlimiting examples of gaseous materials may include air, exhaust gas (e.g., carbon dioxide, or the like), nitrogen gas, or the like. Some nonlimiting examples of fluidic materials may include water, petroleum products (e.g., oil, glycols, or the like), liquidated silicone products, or the like. In one or more embodiments, the liquid may be a lubricant, an anti-corrosion material, an anti-seize material, cleaning product, detergent, or the like. Optionally, the fluid may be any suitable fluid that may manage a temperature of the thermal management structure based on application specific requirements.

In the illustrated embodiment of FIG. 7, the fluid is directed into the thermal management channel 730 via the fluid inlet 742. The fluid is directed along plural cooling channels within the body. For example, a portion of the fluid is directed along the thermal management channels 730A in a direction towards the gaps 612. The thermal management channels 730A are fluidly coupled with one or more thermal management channels 730B, 730C disposed and extending to one or more locations within the pad 610.

In the illustrated embodiment of FIG. 7, the thermal management channels 730B extend within the first portion 628 of the pad 610D from the gap 612 toward the outer surface 652 of the pad. Four thermal management channels 730B are illustrated extending in different radial directions, however the pad may include any number of thermal management channels. The cooling fluid outlets direct a portion of the fluid out of the bearing assembly 600 and onto the outer surface of the pad. In the illustrated embodiment of FIG. 8, the outlets are arranged in an array of substantially uniformly shaped and sized outlets. Additionally or alternatively, in other embodiments the outlets may be arranged in a larger or smaller array. Optionally, one or more of the outlets may have a different size and/or shape relative to one or more other outlets. For example, the outlets may have varying shapes and/or sizes in order to control a pressure of the cooling fluid within the thermal management structure and a pressure of the cooling fluid that is directed out of the thermal management structure of the tilt pad journal bearing assembly. Variations in the arrangement and profile may be made with reference to application specific requirements.

Returning to FIG. 7, the thermal management channels 730A direct a portion of the cooling fluid toward the thermal management channels 730C that extend within the second portion 630 of the pad 610D. However, instead of directing the fluid out of the pad via outlets, the thermal management channels 730C are arranged in a serpentine-like structure. For example, the serpentine structure of the thermal management channels 730C may be arranged to direct the fluid first to an area or location of the pad that has a temperature that is greater than another area or location of the pad. The fluid may transfer thermal energy with the pad and direct the fluid having an increased temperature out of the pad and/or to another location within the pad. Optionally, one or more fluid outlets may direct a portion of the fluid out of the pad along the second portion 630 of the pad. For example, the array of fluid outlets may extend within the first and/or second portions 628, 630 of the pad.

The illustrated embodiment of FIG. 7 is one cross-sectional view of the bearing assembly between the first end and the second end of the body. In one or more embodiments, one or more cooling channels or thermal management channels may extend to one or more locations within the body between the first and second ends along the center axis, and between the first outer surface 604 and the second outer surface 606 in a radial direction about the center axis. The one or more thermal management channels may be fluidly coupled with one or more thermal management channels disposed and extending within the body and/or one or more of the pads. Additionally or alternatively, one or more of the pads may include one or more cooling fluid outlets that direct cooling fluid from inside the structure to a location outside the pad and along the outer surface of the pad. For example, the cooling fluid may be directed toward the passage to lubricate the contact between the shaft (not shown) and the outer surface of the pad.

In one or more embodiments of the subject matter described herein, a thermal management structure may include a body and a pad. The body extends between a first outer surface and a second outer surface. The pad moves relative to the body. A thermal management channel extends within a portion of the body and extends within a portion of the pad. The thermal management channel directs fluid to one or more locations within the body and to one or more locations within the pad.

Optionally, the body extends between a first end and a second end along a center axis. The pad may extend at least a portion of a distance between the first end and the second end along the center axis.

Optionally, the pad may include an inner surface disposed facing toward the second outer surface of the body and an outer surface facing away from the second outer surface of the body. Optionally, the thermal management channel may extend at least a portion of a distance between the inner surface and the outer surface of the pad. Optionally, the thermal management channel may extend between the first outer surface of the body and the inner surface of the pad.

Optionally, the thermal management structure may include a gap disposed between the first outer surface of the body and the inner surface of the pad. The pad may move within the gap relative to the body. Optionally, the outer surface of the pad may define one or more outlets. The thermal management channel may direct at least a portion of the fluid out of the pad and onto the outer surface of the pad.

Optionally, the body may be manufactured of a first material, and the pad may be manufactured of a different, second material.

Optionally, the body and the pad may be formed as a single, unitary, monolithic entity.

Optionally, the body may include a fluid inlet fluidly coupled with the thermal management channel. The fluid inlet may direct the fluid into the thermal management channel.

Optionally, the pad may be a first pad. The thermal management structure may include plural pads coupled with the body.

Optionally, the thermal management channel may be a continuous serpentine thermal management channel that may extend within the body and within each of the plural pads.

Optionally, the pad may be a first pad and the thermal management structure may include plural pads coupled with the body. The body may be annular with the first outer surface defining a first, outer-facing annular surface of the body, and the second outer surface defining a second, inner-facing annular surface of the body. The plural pads may be coupled to the inner-facing annular surface of the body and may be distributed around a circumference of the inner-facing annular surface of the body.

In one or more embodiments of the subject matter described herein, a thermal management structure may include a body and plural pads. The body extends between a first outer surface and a second outer surface. Each of the plural pads includes an inner surface disposed facing toward the second outer surface of the body and an outer surface facing away from the second outer surface of the body. A thermal management channel extends within a portion of the body and extends within a portion of one or more of the pads. The thermal management channel directs fluid to one or more locations within the body. The outer surface of at least one of the pads includes one or more outlets. The thermal management channel directs at least a portion of the fluid to one or more locations within the at least one pad and directs at least a portion of the fluid out of the at least one pad and onto the outer surface of the at least one pad.

Optionally, the plural pads may move relative to the body. Optionally, the thermal management structure may include a gap disposed between the first outer surface of the body and the inner surface of at least one of the pads. The at least one of the pads may move within the gap relative to the body.

Optionally, the thermal management channel may be a continuous serpentine thermal management channel that may extend within the body and within one or more of the plural pads.

Optionally, the body may extend between a first end and a second end along a center axis. At least one of the plural pads may extend at least a portion of a distance between the first end and the second end of the body along the center axis.

Optionally, the plural pads may move in one or more of a radial direction or an axial direction relative to the center axis.

In one or more embodiments of the subject matter described herein, a journal bearing assembly includes a body and plural pads. The body extends between a first outer surface and a second outer surface. Each of the plural pads includes an inner surface disposed facing toward the second outer surface of the body, and an outer surface facing away from the second outer surface of the body. A thermal management structure defines one or more thermal management channels extending within a portion of the body and extending within a portion of at least one of the plural pads. The one or more thermal management channels directs at least a portion of a fluid to one or more locations within the body, at least a portion of the fluid to one or more locations within each of the plural pads, and at least a portion of the fluid out of the at least one of the plural pads and onto the outer surface of the at least one of the plural pads.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMs, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A thermal management structure comprising:
a body and a pad, the body extending between a first outer surface and a second outer surface, the pad configured to move relative to the body; and
a thermal management channel extending within a portion of the body and extending within a portion of the pad, the thermal management channel configured to direct fluid to one or more locations within the body and to one or more locations within the pad.

2. The thermal management structure of claim 1, wherein the body extends between a first end and a second end along a center axis, the pad extends at least a portion of a distance between the first end and the second end along the center axis.

3. The thermal management structure of claim 1, wherein the pad comprises an inner surface disposed facing toward the second outer surface of the body and an outer surface facing away from the second outer surface of the body.

4. The thermal management structure of claim 3, wherein the thermal management channel extends at least a portion of a distance between the inner surface and the outer surface of the pad.

5. The thermal management structure of claim 3, wherein the thermal management channel extends between the first outer surface of the body and the inner surface of the pad.

6. The thermal management structure of claim 3, further comprising a gap disposed between the first outer surface of the body and the inner surface of the pad, the pad configured to move within the gap relative to the body.

7. The thermal management structure of claim 3, wherein the outer surface of the pad defines one or more outlets, the thermal management channel configured to direct at least a portion of the fluid out of the pad and onto the outer surface of the pad.

8. The thermal management structure of claim 1, wherein the body is manufactured of a first material, and the pad is manufactured of a different, second material.

9. The thermal management structure of claim 1, wherein the body and the pad are formed as a single, unitary, monolithic entity.

10. The thermal management structure of claim 1, wherein the body comprises a fluid inlet fluidly coupled with the thermal management channel, wherein the fluid inlet is configured to direct the fluid into the thermal management channel.

11. The thermal management structure of claim 1, wherein the pad is a first pad, the thermal management structure comprising plural pads coupled with the body.

12. The thermal management structure of claim 11, wherein the thermal management channel is a continuous serpentine thermal management channel configured to extend within the body and within each of the plural pads.

13. The thermal management structure of claim 1, wherein the pad is a first pad, the thermal management structure comprising plural pads coupled with the body, wherein the body is annular, the first outer surface defining a first, outer-facing annular surface of the body, and the second outer surface defining a second, inner-facing annular surface of the body, wherein the plural pads are coupled to the inner-facing annular surface of the body and are distributed around a circumference of the inner-facing annular surface of the body.

14. A thermal management structure comprising:
a body and plural pads, the body extending between a first outer surface and a second outer surface, each of the plural pads comprising an inner surface disposed facing toward the second outer surface of the body and an outer surface facing away from the second outer surface of the body; and
a thermal management channel extending within a portion of the body and extending within a portion of one or more of the pads, wherein the thermal management channel is configured to direct fluid to one or more locations within the body,
wherein the outer surface of at least one of the pads comprises one or more outlets, the thermal management channel configured to direct at least a portion of the fluid to one or more locations within the at least one pad and direct at least a portion of the fluid out of the at least one pad and onto the outer surface of the at least one pad.

15. The thermal management structure of claim 14, wherein the plural pads are configured to move relative to the body.

16. The thermal management structure of claim 14, further comprising a gap disposed between the first outer surface of the body and the inner surface of at least one of the pads, the at least one of the pads configured to move within the gap relative to the body.

17. The thermal management structure of claim 14, wherein the thermal management channel is a continuous serpentine thermal management channel configured to extend within the body and within one or more of the plural pads.

18. The thermal management structure of claim 14, wherein the body extends between a first end and a second end along a center axis, at least one of the plural pads extends at least a portion of a distance between the first end and the second end of the body along the center axis.

19. The thermal management structure of claim 18, wherein the plural pads are configured to move in one or more of a radial direction or an axial direction relative to the center axis.

20. A journal bearing assembly comprising:
a thermal management structure comprising a body and plural pads, the body extending between a first outer surface and a second outer surface, each of the plural pads comprising an inner surface disposed facing toward the second outer surface of the body and an outer surface facing away from the second outer surface of the body; and
one or more thermal management channels extending within a portion of the body and extending within a portion of at least one of the plural pads, wherein the one or more thermal management channels are configured to direct a portion of a fluid to one or more locations within the body, a portion of the fluid to one or more locations within the at least one of the plural pads, and a portion of the fluid out of at least one of the plural pads and onto the outer surface of the at least one of the plural pads.

* * * * *